United States Patent
Yin et al.

(10) Patent No.: US 11,836,423 B2
(45) Date of Patent: Dec. 5, 2023

(54) MACHINE LEARNING-BASED CLUSTERING FOR CURVILINEAR LAYOUT DESIGNS

(71) Applicant: Siemens Industry Software Inc., Plano, TX (US)

(72) Inventors: Lianghong Yin, Fremont, CA (US); Fan Jiang, Beaverton, OR (US); Shumay D. Shang, Saratoga, CA (US); Le Hong, Benicia, CA (US)

(73) Assignee: Siemens Industry Software Inc., Plano, TX (US)

( * ) Notice: Subject to any disclaimer, the term of this patent is extended or adjusted under 35 U.S.C. 154(b) by 97 days.

(21) Appl. No.: 17/654,319

(22) Filed: Mar. 10, 2022

(65) Prior Publication Data

US 2023/0289497 A1    Sep. 14, 2023

(51) Int. Cl.
*G06F 30/27* (2020.01)
*G06F 30/392* (2020.01)

(52) U.S. Cl.
CPC ............ *G06F 30/27* (2020.01); *G06F 30/392* (2020.01)

(58) Field of Classification Search
USPC ........................................ 716/50, 51, 52, 53
See application file for complete search history.

(56) References Cited

U.S. PATENT DOCUMENTS

2021/0390234 A1* 12/2021 Gupta ................... G06F 30/392
2021/0406441 A1* 12/2021 Oberai .................. G06F 30/394

FOREIGN PATENT DOCUMENTS

| WO | 2022010467 A1 | 1/2022 |
| WO | 2022010468 A1 | 1/2022 |
| WO | 2022010469 A1 | 1/2022 |

\* cited by examiner

*Primary Examiner* — Bryce M Aisaka (57) ABSTRACT

Various aspects of the present disclosed technology relate to techniques for classifying layout patterns. First, a set of density feature vectors for a set of layout regions in the layout design are extracted using a set of rings. Each component of a density feature vector in the set of density feature vectors corresponds to a ring in the set of rings. The set of rings do not overlap with each other and cover a whole area of a circle when being placed together. Next, a machine learning-based clustering process is performed to separate layout features in the set of layout regions into clusters of layout features based on the set of density feature vectors. Each of the clusters of layout features may be further divided into subclusters based on one or more properties.

18 Claims, 6 Drawing Sheets

Flow chart
400

MACHINE LEARNING-BASED CLUSTERING FOR CURVILINEAR LAYOUT DESIGNS

FIELD OF THE DISCLOSED TECHNOLOGY

The present disclosed technology relates to the field of circuit design and manufacture. Various implementations of the disclosed technology may be particularly useful for verifying, processing layout designs containing curvilinear features.

BACKGROUND OF THE DISCLOSED TECHNOLOGY

Silicon photonics, combining large-scale photonic integration with large-scale electronic integration, can impact areas such as telecommunications, data centers and high-performance computing. Photonics-based computing consumes less energy and transmits data faster than pure electronics-based computing. Silicon photonics designs are often drawn with curved shapes. By contrast, a layout design for conventional circuits contains mainly Manhattan shapes, of which sides/edges are parallel to the x and y axes. In addition to being widely used in silicon photonics, curvilinear patterns can also offer better lithographic quality than Manhattan patterns. Memory chip making has started to explore curvilinear patterns. Due to the practical needs and advantages for using curvilinear patterns, the mask making industry has made progress with the introduction of multi-beam mask writers for writing curvilinear patterns on a mask. But conventional layout pattern fuzzy matching and classification tools are developed to process primarily Manhattan shapes. When being used to process curvilinear shapes, they often suffer both accuracy and performance problems. New technologies for layout pattern clustering techniques are desirable.

BRIEF SUMMARY OF THE DISCLOSED TECHNOLOGY

Various aspects of the present disclosed technology relate to techniques for classifying layout patterns. In one aspect, there is a method comprising: receiving a layout design; extracting a set of density feature vectors for a set of layout regions in the layout design using a set of rings, each component of a density feature vector in the set of density feature vectors corresponding to a ring in the set of rings, the set of rings not overlapping with each other and covering a whole area of a circle when being placed together; performing a machine learning-based clustering process to separate layout features in the set of layout regions into clusters of layout features based on the set of density feature vectors; dividing each of the clusters of layout features into subclusters based on one or more properties; and storing information of the clustered layout features.

The machine learning-based clustering process may comprise: mapping the set of density feature vectors into hyperboxes of a hyperspace.

The one or more properties may comprise curvature, linewidths, spacing or any combination thereof.

Each of the plurality of layout regions may comprise an error detected by performing lithography simulation and checking.

Radius of the circle may be determined based on a range of diffraction or process effects.

The layout design may have curvilinear layout features.

In another aspect, there is one or more computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the present disclosed technology relate to techniques for classifying layout patterns. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "extract", "separate", and "divide" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

Figure 1:
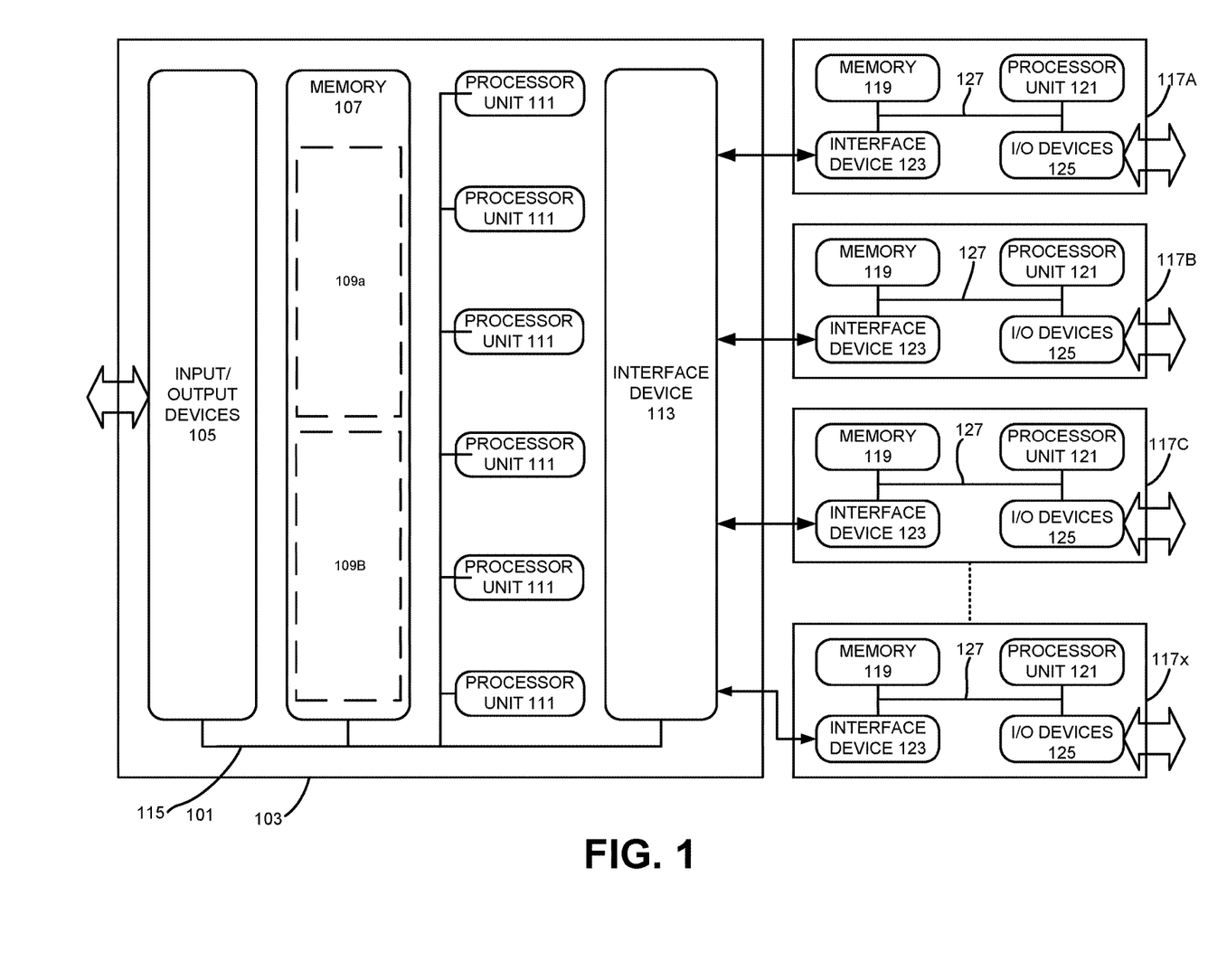
FIG. 1 illustrates an example of a computing system that may be used to implement various embodiments of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RANI), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
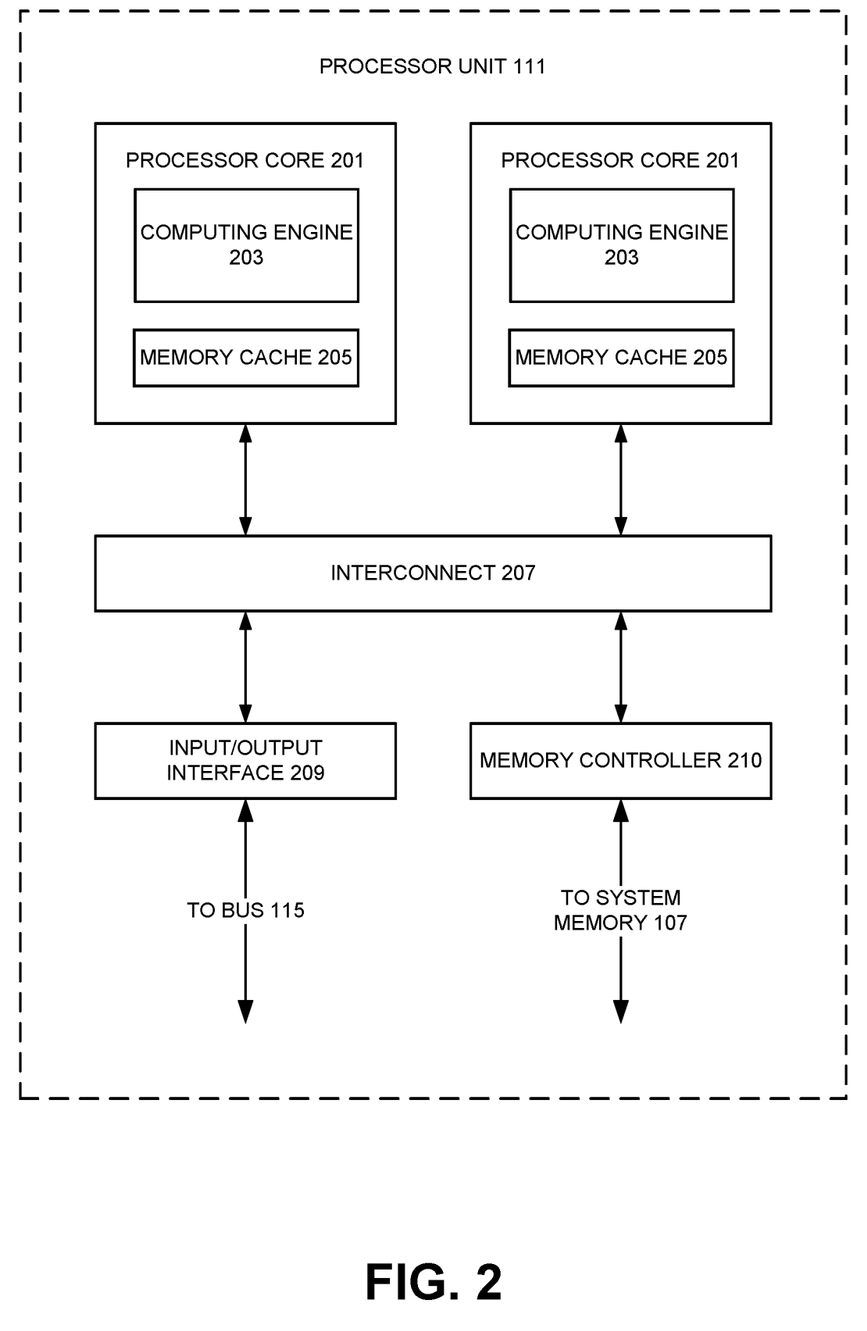
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOT and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, California, the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RANI), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Circuit Design Flow

Electronic circuits, such as integrated microcircuits, are used in a variety of products such as automobiles, personal computers, data center servers, and smart phones. Designing and fabricating integrated circuit devices typically involves many steps, sometimes referred to as a "design flow." The particular steps of a design flow often are dependent upon the type of integrated circuit, its complexity, the design team, and the integrated circuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. For digital circuits, automated place and route tools will be used to define the physical layouts, especially of wires that will be used to interconnect the circuit devices. Each layer of the microcircuit will have a corresponding layer representation in the layout design, and the geometric shapes described in a layer representation will define the relative locations of the circuit elements that will make up the circuit device. For example, shapes in the layer representation of a metal layer will define the locations of the metal wires used to connect the circuit devices. Custom layout editors, such as Mentor Graphics' IC Station or Cadence's Virtuoso, allow a designer to custom design the layout, which is mainly used for analog, mixed-signal, RF, and standard-cell designs.

Integrated circuit layout descriptions can be provided in many different formats. The Graphic Data System II (GDSII) format is a popular format for transferring and archiving two-dimensional graphical IC layout data. Among other features, it contains a hierarchy of structures, each structure containing layout elements (e.g., polygons, paths or poly-lines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in IC layout designs that are employed to manufacture integrated circuits. Once the microcircuit device design is finalized, the layout portion of the design can be used by fabrication tools to manufacture the device using a photolithographic process.

Typically, a designer will perform a number of verification processes on the layout design. For example, the layout design may be analyzed to confirm that it complies with various design requirements, such as minimum spacing between geometric elements and minimum linewidths of geometric elements. In this process, a DRC (design rule checking) tool takes as input a layout in the GDSII standard format and a list of rules specific to the semiconductor process chosen for fabrication. A set of rules for a particular process is referred to as a run-set, rule deck, or just a deck. An example of the format of a rule deck is the Standard Verification Rule Format (SVRF) by Mentor Graphics Corporation.

The layout design are also analyzed to confirm that it accurately represents the circuit devices and their relationships described in the device design. A conventional LVS (layout versus schematic) process comprises two phases: extraction and comparison. In the extraction phase, a netlist is extracted from the layout design. The netlist includes not only types of and connectivity between the devices but also device parameters. In the comparison phase, the LVS tool compares the extracted netlist with the source netlist which is taken from the circuit schematic, and reports violations if any. LVS can be augmented by formal equivalence checking, which checks whether two circuits perform exactly the same function without demanding isomorphism.

As designers and manufacturers continue to shrink the size of circuit components, the shapes reproduced on the substrate through photolithography become smaller and are placed closer together. This reduction in feature size and spacing increases the difficulty of faithfully reproducing the image onto the substrate intended by the design layout and can create flaws in the manufactured device. To address the problem, one or more resolution enhancement techniques are often employed to improve the resolution of the image that the mask forms on the substrate during the photolithographic process.

One of resolution enhancement techniques, "optical proximity correction" or "optical process correction" (OPC), tries to compensate for light diffraction effects. When light illuminates the photomask, the transmitted light diffracts. The higher spatial frequencies the regions of the mask have, the higher angles the light diffracts at. The resolution limits of the lens in a photolithographic system make the lens act effectively as a low-pass filter for the various spatial frequencies in the two-dimensional layout. This can lead to optical proximity effects such as a pull-back of line-ends from their desired position, corner rounding and a bias between isolated and dense structures. The optical proximity correction can adjust the amplitude of the light transmitted through a lithographic mask by modifying the layout design data employed to create the photomask. For example, edges in the layout design may be adjusted to make certain portions of the geometric elements larger or smaller, in accordance with how much additional light exposure (or lack of exposure) is desired at certain points on the substrate. When these adjustments are appropriately calibrated, overall pattern fidelity is greatly improved, thereby reducing optical proximity effects.

Once a layout design is processed by resolution enhancement techniques, a verification technique based on lithography simulation can be performed to determine how the layout design will be printed on silicon. Manufacture process variability can have a dramatic effect on yield. The simulation-based verification can detect lithographic errors or marginalities caused by process variability and ensure that OPC corrections are adequate.

Layout Pattern Classification Tool

Figure 3:
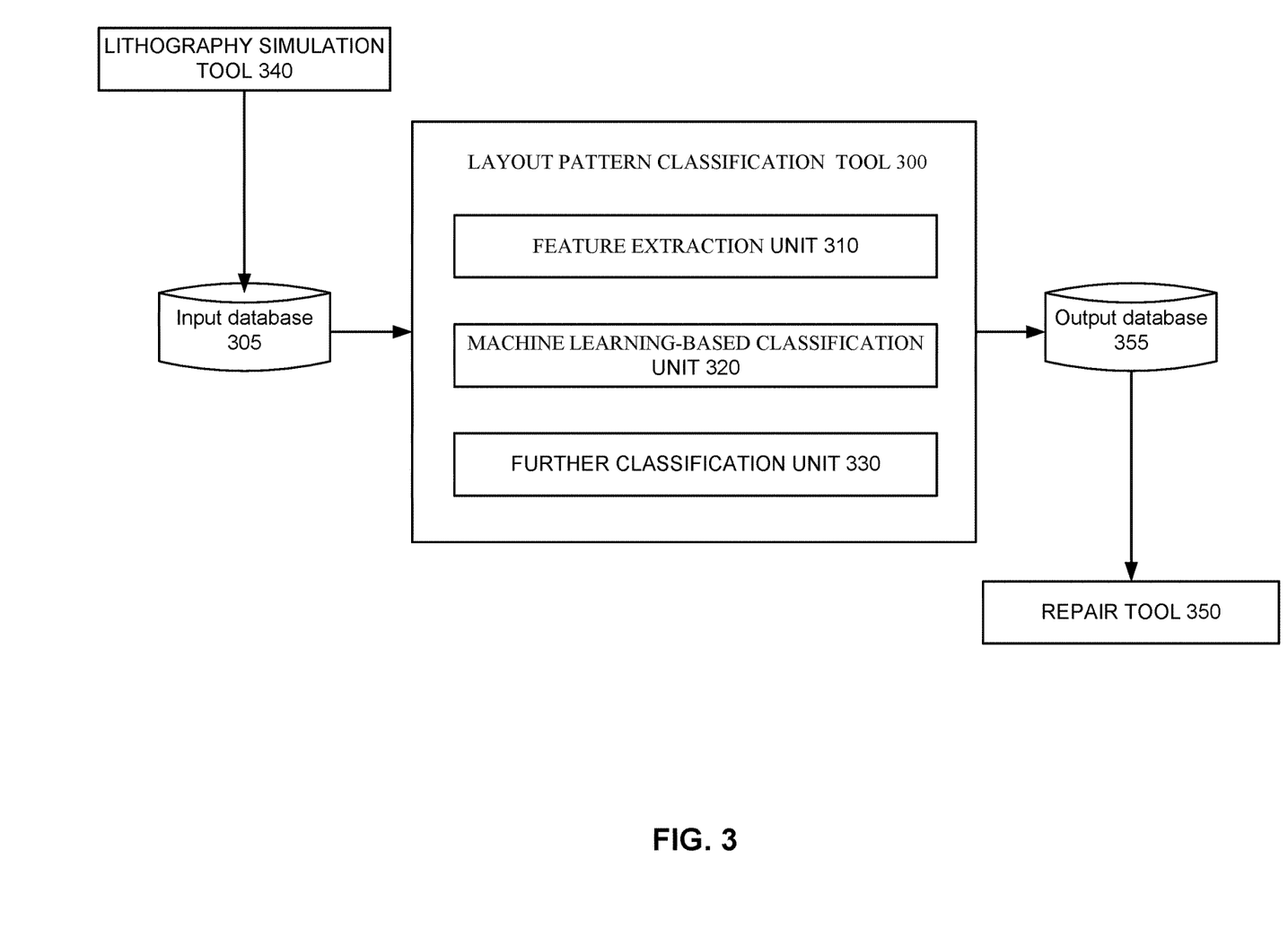
FIG. 3 illustrates an example of a layout pattern classification tool that may be implemented according to various embodiments of the disclosed technology.

FIG. 3 illustrates an example of a layout pattern classification tool 300 that may be implemented according to various embodiments of the disclosed technology. As seen in this figure, the layout pattern classification tool 300 includes a feature extraction unit 310, a machine learning-based classification unit 320, and a further classification unit 330. Various implementations of the layout pattern classification tool 300 may cooperate with (or incorporate) one or more of a lithography simulation tool 340, a repair tool 350, an input database 305 and an output database 355.

As will be discussed in more detail below, the layout pattern classification tool 300 can receive a layout design from the input database 305. The feature extraction unit 310 can extract a set of density feature vectors for a set of layout regions in the layout design using a set of rings. Each component of a density feature vector in the set of density feature vectors corresponds to a ring in the set of rings. The set of rings do not overlap with each other and cover a whole area of a circle when being placed together. The machine learning-based classification unit 320 can perform a machine learning-based clustering process to separate layout features in the set of layout regions into clusters of layout features based on the set of density feature vectors. The further classification unit 330 can separate each of the clusters of layout features into subclusters based on one or more properties. The layout pattern classification tool 300 can store information of the clustered layout features in the output database 355. Each of the plurality of layout regions may comprise one or more lithographic errors detected by the lithography simulation tool 340. To verify the layout design and detect lithographic errors if any, the lithography simulation tool 340 can perform lithography simulation on the layout design. The repair tool 350 can fix the problems identified by analyzing the clustered layout features.

As previously noted, various examples of the disclosed technology may be implemented by one or more computing systems, such as the computing system illustrated in FIGS. 1 and 2. Accordingly, one or more of the feature extraction unit 310, the machine learning-based classification unit 320, the further classification unit 330, the lithography simulation tool 340, and the repair tool 350 may be implemented by executing programming instructions on one or more processors in one or more computing systems, such as the computing system illustrated in FIGS. 1 and 2. Correspondingly, some other embodiments of the disclosed technology may be implemented by software instructions, stored on a non-transitory computer-readable medium, for instructing one or more programmable computers/computer systems to perform the functions of one or more of the feature extraction unit 310, the machine learning-based classification unit 320, the further classification unit 330, the lithography simulation tool 340, and the repair tool 350. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the feature extraction unit 310, the machine learning-based classification unit 320, the further classification unit 330, the lithography simulation tool 340, and the repair tool 350 are shown as separate units in FIG. 3, a single computer (or a single processor within a master computer) or a single computer system may be used to implement some or all of these units at different times, or components of these units at different times.

With various examples of the disclosed technology, the input database 305 and the output database 355 may be implemented using any suitable computer readable storage device. That is, either of the input database 305 and the output database 355 may be implemented using any combination of computer readable storage devices including, for example, microcircuit memory devices such as read-write memory (RANI), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 305 and the output database 355 are shown as separate units in FIG. 3, a single data storage medium may be used to implement some or all of these databases.

Process of Layout Versus Schematic for Photonic Devices

Figure 4:
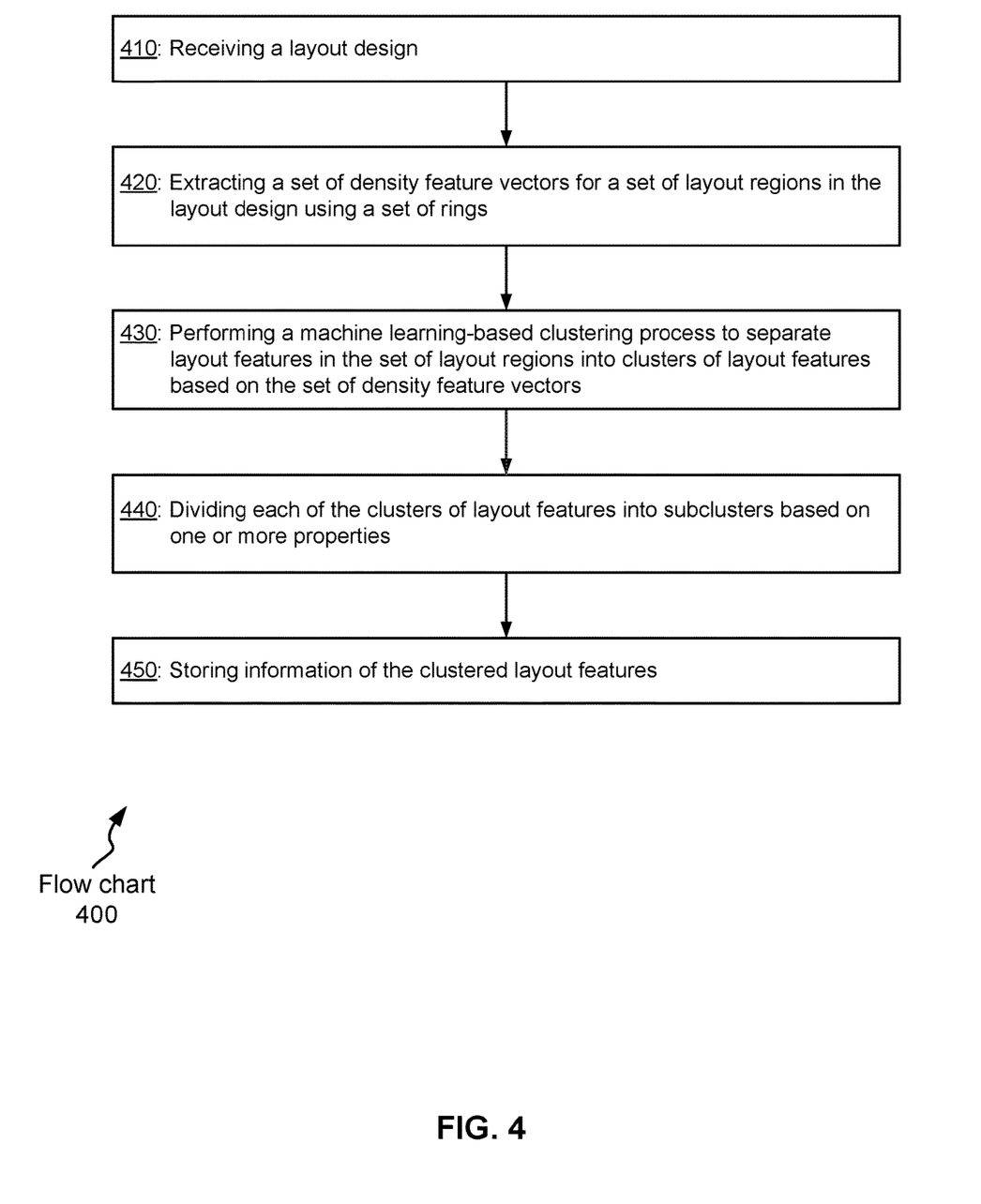
FIG. 4 illustrates a flowchart showing a process of layout pattern classification that may be implemented according to various examples of the disclosed technology.

FIG. 4 illustrates a flowchart 400 showing a process of layout pattern classification that may be implemented according to various examples of the disclosed technology. For ease of understanding, methods of layout pattern classification that may be employed according to various embodiments of the disclosed technology will be described with reference to the layout pattern classification tool 300 in FIG. 3 and the flow chart 400 illustrated in FIG. 4. It should be appreciated, however, that alternate implementations of a layout pattern classification tool may be used to perform the methods of layout pattern classification illustrated by the flow chart 400 according to various embodiments of the disclosed technology. Likewise, the layout pattern classification tool 300 may be employed to perform other methods of layout pattern classification according to various embodiments of the disclosed technology.

In operation 410 of the flow chart 400, the layout pattern classification tool 300 receives a layout design from the input database 305. The layout design may be in the GDSII standard format or the OASIS standard format. The layout design may be derived from a circuit design using a place and route tool. Alternatively, the layout design may be one that has been processed by an optical proximity correction tool. The layout design may represent a full-chip design or a portion of a full-chip design. The layout design may comprise curvilinear features which have curved boundary lines or line segments. A curvilinear feature may be a part or a whole of a photonic device such as ring resonators or grating couplers. A curvilinear feature in the layout design may also be generated through an optical proximity correction process based on the inverse lithography technology.

In operation 420, the feature extraction unit 310 extracts a set of density feature vectors for a set of layout regions in the layout design using a plurality of rings. Each density feature vector characterizes layout features in a layout region. A layout region can be a region centered at a point of interest. The point of interest may be a layout feature identified to be a lithographic error by the lithography simulation tool 340 or a layout feature identified to be a hotspot candidate by a design for manufacture tool or a design rule checking tool. A hotspot is a layout pattern that may induce printability issues in lithography process. For example, a pinching-type hotspot can result in an open or pinching defect; and a bridging-type hotspot can lead to a bridge defect. Hotspots can include lithographic errors associated with process variability which can be detected by the lithography simulation tool 340.

The size of a layout region can be set based upon the range of diffraction or process effects. Printing errors of a layout feature can be caused by its neighboring layout features. How far away a neighboring layout feature can affect the printability depends at least in part on the wavelength of the light source used for lithography. The size of a layout region can thus be set as several multiples of the wavelength or the minimum line spacing that can be achieved in a particular technology node. In a state-of-the-art deep ultraviolet (DUV) lithography process, the light source is 193 nm excimer lasers. The minimum metal line width in single exposure for the 7 nm or 10 nm technology node is about 40 nm. Accordingly, the layout region can be set as, for example, 200 nm in radius for a circle shape or 400 nm in side length for a square shape. For silicon photonics design, typical waveguide width is from 350 nm to 500 nm while minimum line width or space is about 100 nm. Accordingly, the layout region can be set as, for example, 1 micron in radius for a circle shape or 2 micron in side length for a square shape.

Figure 5:
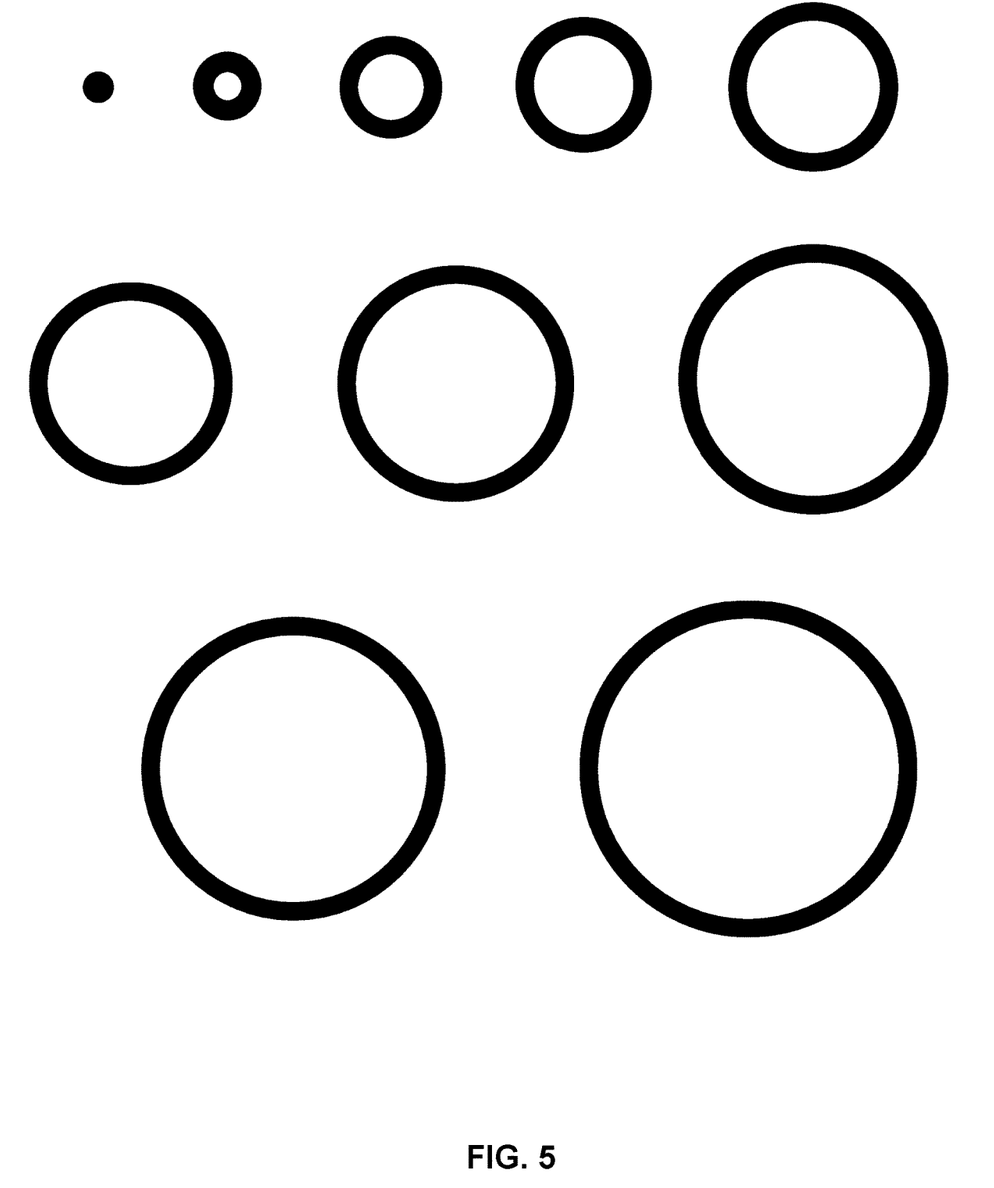
FIG. 5 illustrates an example of ten rings which the feature extraction unit can use to extract the set of density feature vectors according to various embodiments of the disclosed technology.

As noted previously, each component of a density feature vector in the set of density feature vectors corresponds to a ring in the plurality of rings. The plurality of rings do not overlap with each other and cover a whole area of a circle when being placed together. FIG. 5 illustrates an example of ten rings which the feature extraction unit 310 can use to extract the set of density feature vectors according to various embodiments of the disclosed technology. These ten rings have the same width (width being difference between the outside and inside radii). Being placed together, they can cover a circle with a radius equal to the outside radius of the largest ring. If the outside radius of the largest ring is 1 micron, the width is 100 nm. To derive a density feature vector for a layout region, the feature extraction unit 310 can place the set of rings on the layout region and compute the percentage of area in each of the rings occupied by layout features in the layout region. It should be noted that the feature extraction unit 310 may use more than or fewer than ten rings. It should also be noted that the feature extraction unit 310 may use rings with unequal widths.

Referring back to FIG. 4, in operation 430, the machine learning-based classification unit 320 performs a machine learning-based clustering process to separate layout features in the plurality of layout regions into clusters of layout features based on the set of density feature vectors. The machine learning-based classification unit 320 can employ various machine learning models for the clustering process. According to some embodiments of the disclosed technology, the machine learning model for the clustering process is a hyperspace-based machine learning model. A hyperspace may refer to or include a coordinate space with multiple dimensions to map multiple parameter values of data points in a dataset (whether directly or as transformed parameters), and with at least a portion of the coordinate system partitioned into hyperboxes. Hyperboxes of a generated hyperspace may be used to process large datasets in an efficient and accurate manner. As described in greater detail herein, a hyperspace may be generated by transforming a feature space of a dataset (feature vectors) and quantizing the transformed feature space into a set of hyperboxes. Processing of the dataset may be performed by processing the quantized hyperboxes of the hyperspace that contain at least one or more mapped feature vectors of the dataset. The hyperspace generation and hyperspace-based processing features may have O (n) complexity, and the described hyperspace features may thus exhibit increased computational efficiency and speed as compared to other O ($n^2$) processing techniques such as K-means clustering and Mahalanobis cluster computations.

Figure 6:
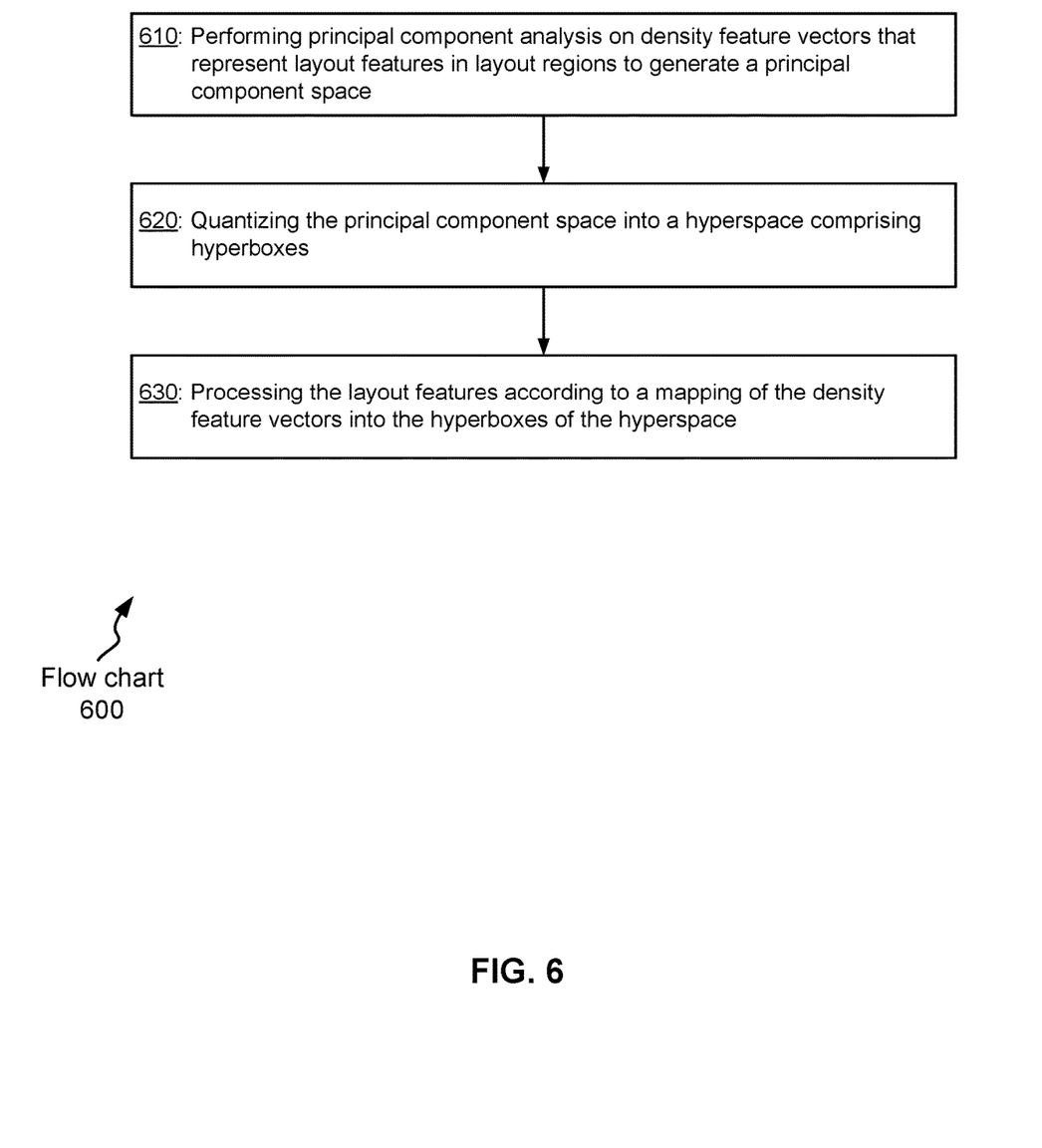
FIG. 6 illustrates a flowchart showing a process for using a hyperspace-based machine learning model to classify layout features based on density feature vectors that may be implemented according to various examples of the disclosed technology.

FIG. 6 illustrates a flowchart 600 showing a process for using a hyperspace-based machine learning model to classify layout features based on density feature vectors that may be implemented according to various examples of the disclosed technology. In operation 610, the machine learning-based classification unit 320 performs principal component analysis (or any other multi-variate transformation) on a set of density feature vectors to generate a principal component space. The space where the set of density feature vectors are located may be referred to as feature space. The set of density feature vectors are extracted from layout features in a set of layout regions. Each density feature vector in the set of density feature vectors represents layout features in one layout region in the set of layout regions. In another word, layout features in the layout regions are mapped in the feature space as the set of density feature vectors. By performing principal component analysis on the set of density feature vectors, the machine learning-based classification unit 320 can map the set of density feature vectors into the principal component space, which is a different coordinate system that further correlates the parameter values of the layout features and supports variance determinations through the transformation.

In some implementations, the machine learning-based classification unit 320 may perform the transformation from a feature space into a corresponding principal component space using a covariance (or correlation) matrix. Eigenvectors of the covariance matrix may represent how each parameter of a feature space maps to each principal component of the principal component space. The machine learning-based classification unit 320 may further determine eigenvalues for each principal component of a principal component space, and determined principal component eigenvalues may represent the dataset variance attributable to the principal component (e.g., a higher eigenvalue may indicate that a given principal component exhibits, measures, or characterizes a greater data variance relative to other principal components with lower eigenvalues). The transformation can be equivalent to a rotation of the principal component axes from the feature space based on eigenvalues determined for the principal components of the principal component space.

In operation 620, the machine learning-based classification unit 320 quantizes the principal component space into a hyperspace comprising hyperboxes. The machine learning-based classification unit 320 can determine dimension values of the hyperboxes to specifically account for variance among parameters of the principal component space (e.g., based on variance attributable to the principal components of the transformed feature space). Quantizing the principal component space may refer to partitioning at least a portion of the principal component space into hyperboxes. A hyperbox may refer to an 'n'-dimensional enclosed shape with hyperbox dimension values along each dimension of the principal component space. In particular, the number of dimensions of hyperboxes may be equal to the number of dimensions of the principal component space. According to some embodiments of the disclosed technology, the machine learning-based classification unit 320 can set the dimension size of hyperboxes along one principal component axis of the first principal component as a function of a value range for the first principal component and a predetermined divider value. The first principal component may be the principal component having the highest variance among the principal components of the principal component space. In particular, the machine learning-based classification unit 320 may determine a value range (between a minimum value and a maximum value) of the first principal component for the set of density feature vectors mapped into the principal component space. The machine learning-based classification unit 320 may then divide the value range by the predetermined divider value. By adjusting the divider value, the machine learning-based classification unit 320 can flexibly control how granular, precise, sparse, or dense the hyperbox partitioning in a quantized hyperspace will be. For the remaining principal components, the machine learning-based classification unit 320 may determine dimension values as a function of the value range for the remaining principal components respectively, the predetermined divider value, and a variance ratio between the first and the remaining principal components respectively (e.g., as measured through the determined eigenvalues of the principal components). By accounting for variance ratios in hyperbox dimension value determinations, the machine learning-based classification unit 320 may partition a range of values along a particular principal component for a transformed feature space at lesser granularity or precision as compared to the number of partitions for the first principal component. Quantizing the principal component space into a hyperspace comprised of hyperboxes effectively partitions the principal component space into different bins, clusters, or partitions. Each hyperbox of the hyperspace may act as a cluster element by which the layout features can be processed. The machine learning-based classification unit 320 can vary the number of bins/clusters/partitions by changing the divider value. Hyperbox dimension determination and transformed feature space quantization may be performed in O (n) time, allowing for clustering of transformed feature vectors for layout features with increased computational efficiency while nonetheless supporting analyses that account for dataset variance.

In operation 630, the machine learning-based classification unit 320 processes the layout features in the plurality of layout regions according to a mapping of the density feature vectors into the hyperboxes of the hyperspace. The machine learning-based classification unit 320 can use the covariance matrix to map the density feature vectors into the hyperspace. Each of the transformed feature vectors may be bound by a respective hyperbox in the hyperspace. The transformed feature vectors encapsulated by the same hyperbox may form a cluster for processing purposes. As such, the machine learning-based classification unit 320 may group these multiple feature vectors (and corresponding layout features) as part of a same cluster.

The set of feature vectors used by the machine learning-based classification unit 320 to generate the hyperspace may represent layout features different from those to be clustered. Such classification may be semi-supervised in the sense that layout features represented in the feature vector set used to generate the hyperspace may be pre-classified based or otherwise labeled. For example, these layout features comprise known hotspots and non-hotspots. Accordingly, the machine learning-based classification unit 320 can label hyperboxes of the hyperspace as "hotspot" hyperboxes responsive to a determination that a given hyperbox includes, contains, or encapsulates at least a threshold number of known hotspots from the density feature vector set. With such a labeling, the machine learning-based classification unit 320 may determine whether a hyperbox is a "hotspot" or a "non-hotspot" hyperbox and classify the layout features mapped into the hyperbox accordingly. Note that such labeling of hyperboxes may occur prior to or concurrently with the processing of the set of density feature vectors. The labeling can also help determine the divider value and thus the number of bins/clusters/partitions.

Referring back to FIG. 4, in operation 440, the further classification unit 330 divides each of the clusters of layout features into subclusters based on one or more properties. The one or more properties may comprise linewidths, spacing, curvature, or any combination thereof. The further classification unit 330 may separate the layout features into a concave subcluster, a convex subcluster, and a subcluster with curvature being zero. Alternatively or additionally, the further classification unit 330 may separate the layout features into subclusters having certain ranges of linewidths/spacing.

In operation 450, the layout pattern classification tool 300 stores information of the clustered layout features in the output database 355.

The repair tool 350 can fix the problems identified by analyzing the clustered layout features. According to some implementations of the disclosed technology, the repair tool 350 may adjust the layout design to fix the hotspots identified. According to some other implementations of the disclosed technology, the repair tool 350 may adjust lithography process parameters.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A method, executed by at least one processor of a computer, comprising:
   receiving a layout design;
   extracting a set of density feature vectors for a set of layout regions in the layout design using a set of rings, each component of a density feature vector in the set of density feature vectors corresponding to a ring in the set of rings, the set of rings not overlapping with each other and covering a whole area of a circle when being placed together;
   performing a machine learning-based clustering process to separate layout features in the set of layout regions into clusters of layout features based on the set of density feature vectors;
   dividing each of the clusters of layout features into subclusters based on one or more properties; and
   storing information of the clustered layout features.

2. The method recited in claim 1, wherein the machine learning-based clustering process comprises: mapping the set of density feature vectors into hyperboxes of a hyperspace.

3. The method recited in claim 1, wherein the one or more properties comprise curvature, linewidths, spacing or any combination thereof.

4. The method recited in claim 1, wherein each of the plurality of layout regions comprises an error detected by performing lithography simulation and checking.

5. The method recited in claim 1, wherein radius of the circle is determined based on a range of diffraction or process effects.

6. The method recited in claim 1, wherein the layout design has curvilinear layout features.

7. One or more non-transitory computer-readable media storing computer-executable instructions for causing one or more processors to perform a method, the method comprising:
   receiving a layout design;
   extracting a set of density feature vectors for a set of layout regions in the layout design using a set of rings, each component of a density feature vector in the set of density feature vectors corresponding to a ring in the set of rings, the set of rings not overlapping with each other and covering a whole area of a circle when being placed together;

performing a machine learning-based clustering process to separate layout features in the set of layout regions into clusters of layout features based on the set of density feature vectors;

dividing each of the clusters of layout features into subclusters based on one or more properties; and storing information of the clustered layout features.

8. The one or more non-transitory computer-readable media recited in claim 7, wherein the machine learning-based clustering process comprises: mapping the set of density feature vectors into hyperboxes of a hyperspace.

9. The one or more non-transitory computer-readable media recited in claim 7, wherein the one or more properties comprise curvature, linewidths, spacing or any combination thereof.

10. The one or more non-transitory computer-readable media recited in claim 7, wherein each of the plurality of layout regions comprises an error detected by performing lithography simulation and checking.

11. The one or more non-transitory computer-readable media recited in claim 7, wherein radius of the circle is determined based on a range of diffraction or process effects.

12. The one or more non-transitory computer-readable media recited in claim 7, wherein the layout design has curvilinear layout features.

13. A system, comprising:
one or more processors, the one or more processors programmed to perform a method, the method comprising:

receiving a layout design;

extracting a set of density feature vectors for a set of layout regions in the layout design using a set of rings, each component of a density feature vector in the set of density feature vectors corresponding to a ring in the set of rings, the set of rings not overlapping with each other and covering a whole area of a circle when being placed together;

performing a machine learning-based clustering process to separate layout features in the set of layout regions into clusters of layout features based on the set of density feature vectors;

dividing each of the clusters of layout features into subclusters based on one or more properties; and storing information of the clustered layout features.

14. The system recited in claim 13, wherein the machine learning-based clustering process comprises: mapping the set of density feature vectors into hyperboxes of a hyperspace.

15. The system recited in claim 13, wherein the one or more properties comprise curvature, linewidths, spacing or any combination thereof.

16. The system recited in claim 13, wherein each of the plurality of layout regions comprises an error detected by performing lithography simulation and checking.

17. The system recited in claim 13, wherein radius of the circle is determined based on a range of diffraction or process effects.

18. The system recited in claim 13, wherein the layout design has curvilinear layout features.

* * * * *